United States Patent Office 3,309,170
Patented Mar. 14, 1967

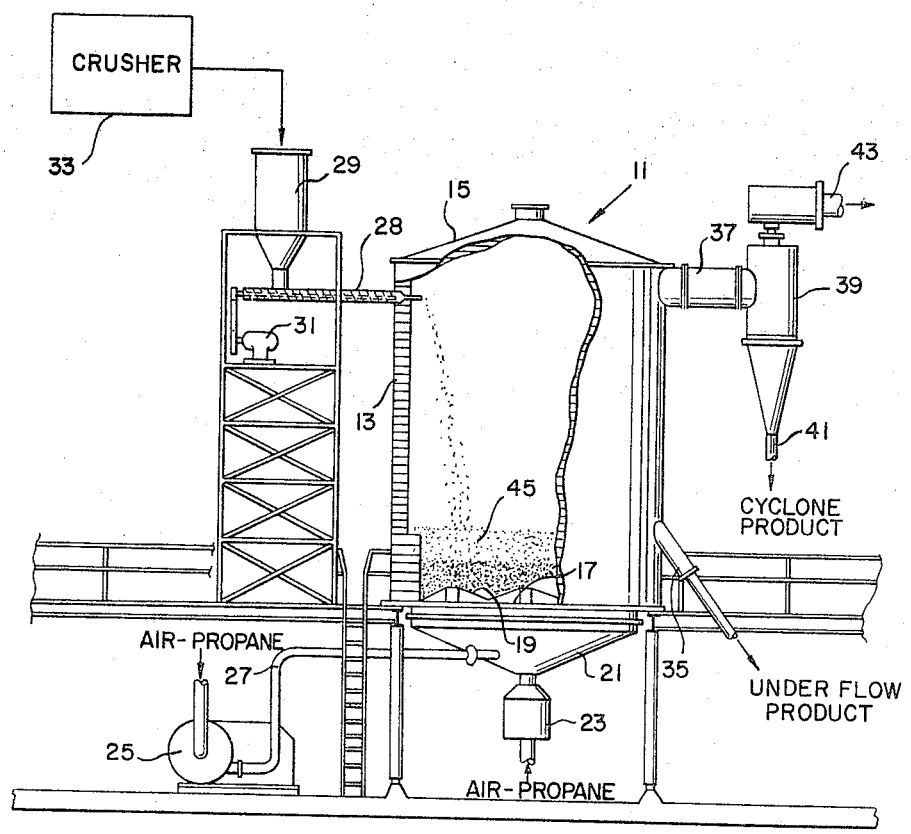

3,309,170
METHOD OF CALCINING AND CLASSIFYING BORATE
William T. Griswold, Belvedere, Calif., assignor to Kern County Land Company, San Francisco, Calif., a corporation of California
Filed Mar. 21, 1963, Ser. No. 266,877
4 Claims. (Cl. 23—59)

This invention relates to the calcining and classification of borate and more particularly to the simultaneous calcining and classification of those certain borate minerals which decrepitate at a temperature below their agglomerating temperature.

In the production of borate ($B_2O_3$) the usual method in the prior art, employs a rotary kiln, wherein the borate mineral which may be colemanite, ulexite, or any of the other various borates, is calcined by subjecting it to a temperature at or greater than the temperature at which endothermic reaction begins. Thus, water molecules are driven off from the various minerals in the rotary kiln and a somewhat concentrated borate is produced.

In the method of the prior art, however, after the borate has been calcined, it is usually in combination with a gangue made up of the various impurities found with the borate ore. Consequently, it is necessary to further crush the calcined ore and to up-grade it by any of several various separating methods such as tabling, air flotation and the like.

It has been noted that of the many borate minerals several, when subjected to a minimum heat, void their molecules of water by decrepitation. In this group of borates is included borax which decrepitates at about 200° C. and tincalconite which decrepitates at about 130° C. In addition, this group includes colemanite which decrepitates violently at about 350° C.

While the fact of decrepitation of borates has been well known for a number of years, this natural phenomenon has not been effectively employed in the calcination and classification of the minerals. Rather calcination and classification even of these borates, has been accomplished in the past, by roasting or calcining in a rotary kiln, and subsequently upgrading and classifying in one of the above mentioned well known methods.

It is, therefore, a general object of this invention to provide an improved method of calcining and classifying borates of the group including borax, tincalconite and colemanite.

It is a more particular object of this invention to provide an improved method of calcining and clasisfying borates of the above mentioned nature in which the calcining and classifying steps are accomplished simultaneously.

It is still another object of this invention to provide a method of the aforementioned character wherein the decrepitation of the borate is employed to provide classification thereof.

It is a further object of this invention to provide a method of the aforementioned character wherein the borate is roasted in a fluidized bed furnace such that an upwardly directed stream of gas is passed through the decrepitating borate thereby carrying with it the finer particles of decrepitation, such that they may be separated from the fluidized bed and the gangue.

These and other objects and features of the invention will become more clearly apparent upon a review of the following description in conjunction with the accompanying drawing, in which the single figure is a schematic diagram of a fluidized bed furnace used in accordance with one embodiment of the invention.

Referring to the drawing, there is shown a fluidized bed furnace 11 which includes generally cylindrical walls 13 of refractory material carrying a refractory roof 15. The base of the furnace includes a perforated plate 17 upon which are positioned a plurality of cups 19 for insuring proper direction and density of gas flow. An inverted hood 21 serves as a plenum to receive gases to be passed through the furnace. A heater 23 is disposed at the bottom of the plenum 21 and is connected to a source of fuel or fuel-air mixture such as air and propane. Means are provided for initiating a flame within the heater 23, such that the plenum within the hood 21 is heated. A blower 25 serves to pass air and/or fuel by means of the conduit 27 into the hood 21. Air, as well as fuel is passed from the hood 21 upward through the perforated plate 17 and past the deflecting cups 19 to provide a generally upwardly directed stream of gas.

A feed pipe 28, which may, conveniently, be of the internal screw feed type, is disposed at the upper end of the furnace 11 and is connected to a hopper 29. A motor 31 serves to operate the screw within the feed pipe 28 whereby material from the hopper 29 may be passed through the feed pipe into the interior of the furnace 11.

If the mineral to be treated is of a size too great to be fluidized within the furnace 11, a crusher, shown schematically at 33, may be employed in a preliminary step to reduce the size of the material. The output of the crusher may be fed to the hopper 29 by any of various well known means.

The output of the furnace 11 includes a product underflow line 35 and a gas stream outlet 37. As will be seen hereinafter gangue from the process is passed through the underflow line 35 while flying particles are passed outwardly with the gas stream through the outlet 37. The outlet 37 is connected to a cyclone 39 which separates the fines and passes them through its outlet pipe 41, while passing the gas itself through the outlet 43. If desired, the outlet from the line 43 may be further filtered by passing the same through an additional cyclone and/or through a collecting sock.

In accordance with the method of the invention a borate of the group including borax, tincalconite and colemanite is supplied to the hopper 29. Simultaneously, a gas such as air and propane is applied through the pump 25 and line 27 upward through the perforated line 17. Consequently, an upward flow of gas is produced within the furnace 11. The flow of gas is sufficient to provide a fluidized bed 45 but is insufficient to blow a substantial portion of the raw borate upward and out through the line 37.

In addition, heat is applied to the fluidized bed by means of the heater 23 and the temperature thereof is raised to that sufficient to decrepitate the borate. In the case of tincalconite, decrepitation begins at about 130° C. Decrepitation of borax begins at about 200° C. while colemanite decrepitates violently at between 350° C. and 400° C.

An upper limit of the temperature must be maintained within the furnace due to agglomeration of the borate. For instance, at temperatures above 550° C. colemanite becomes sufficiently sticky to cause agglomeration. With this agglomeration the particles, even those decrepitated, become heavy and cannot be blown free of the fluidized bed.

Once the borate has been heated enough to decrepitate the smaller particles of decrepitation are carried upward with the flow of gas through the outlet 37 and consequently, into the cyclone 39. The larger particles on the other hand, remain in the fluidized bed and form gangue therein which is drawn off as an underflow product through the pipe 35. Since the finer particles are, for the most part, particles of decrepitation, they have relatively few impurities. Moreover, since the decrepitation is caused by the loss of water molecules, these particles are relatively dehydrated.

The following laboratory examples have been performed utilizing FluoSolids reactor of the type manufactured by Dorr-Oliver Incorporated. The reactor included a four inch inside diameter stainless steel tube, nine feet long and mounted vertically in an insulated fire lined chimney. The following table shows the pertinent information with respect to each of these laboratory tests.

|  | Example No. 1 | Example No. 2 |
|---|---|---|
| Time of run (minutes) | 24 | 24 |
| Fluid Bed Temperature (° C.) | 360 | 550 |
| Freeboard and Cyclone Temperature (° C.) | 340 | 535 |
| Inlet Gas Temperature (° C.) | 350 | 535 |
| Fluidizing Gas: | | |
| Air Rate (s.c.f.m.) | 30.8 | 27.5 |
| $C_3H_8$ Rate (s.c.f.m.) | 0.22 | 0.33 |
| Space Velocity (ft. per sec.) | 13.2 | 14.8 |
| Fluid Bed Depth (inches) | 2–3 | 12–14 |
| Amount of Feed (grams) | 3,000 | 12,000 |
| Amount of Cyclone Product (grams) | 1,996 | 6,713 |
| Cyclone Product Grade (Percent $B_2O_3$) | 39.8 | 45.5 |
| Percent $B_2O_3$ Recovery in Cyclone Product | 80.0 | 75.4 |
| Percent Residual $H_2O$ in Cyclone Product | 27.9 | 1.6 |
| Percent Residual $H_2O$ in Bed Underflow Product | 0.0 | 0.9 |

| Size Analysis | Feed Input | Cyclone Product | |
|---|---|---|---|
| | | Example No. 1 | Example No. 2 |
| Percent +6 mesh | 43.3 | | |
| Percent +8 mesh | 50.8 | | |
| Percent +10 mesh | 58.9 | | |
| Percent +14 mesh | 66.5 | | |
| Percent +20 mesh | 74.0 | Trace | 1.0 |
| Percent +28 mesh | 81.0 | 3.6 | 6.3 |
| Percent +35 mesh | 85.9 | 13.2 | 13.9 |
| Percent +48 mesh | 89.9 | 26.0 | 26.0 |
| Percent +65 mesh | 93.1 | 40.0 | 42.7 |
| Percent +100 mesh | 95.3 | 53.1 | 59.0 |
| Percent +150 mesh | 96.0 | 62.3 | 70.4 |
| Percent +200 mesh | 97.6 | 71.1 | 80.0 |
| Percent −35 mesh | 14.1 | 86.8 | 86.1 |

As a first commercial example of the invention an 8 foot diameter, fluidized bed reactor may be employed operating at a fluid bed temperature of about 550° C. An input of colemanite ore having a size of 100%, −½ inch is fed at the rate of 20 t./hr. into the furnace. The space velocity of heated gas within the furnace is maintained at 14.8 feet per second.

As an alternative commercial embodiment of the invention, a 16 foot diameter, fluidized bed reactor may be employed operating at a fluid bed temperature of about 360° C. An input of colemanite ore having a size of 100%, −½ inch is fed at the rate of 20 t./hr. into the furnace. The space velocity of heated gases within the furnace is maintained at 13.2 feet per second.

I claim:
1. The method of simultaneously calcining and classifying a borate of the group including borax, colemanite and tincalconite comprising the steps of subjecting the borate to a temperature at least as high as that at which the borate decrepitates into fine particles and less than that at which the borate agglomerates, simultaneously passing an upwardly directed stream of gas through the particles of decrepitation whereby the finer particles are carried upward by the stream of gas and the larger particles fall under the force of gravity to thereby classify the finished product, and recovering said finer particles.

2. The method of simultaneously calcining and classifying colemanite comprising the steps of subjecting the colemanite to a temperature at least as high as that at which the colemanite decrepitates violently into fine particles, simultaneously passing an upwardly directed stream of gas through the particles of decrepitation whereby the finer particles are carried upward by the stream of gas and the larger particles fall under the force of gravity to thereby classify the finished product, and recovering said finer particles.

3. The method of simultaneously calcining and classifying colemanite comprising the steps of crushing the colemanite to a size suitable for fluidization, passing an upwardly directed stream of gas through the crushed colemanite to thereby provide a fluidized bed, subjecting the fluidized bed to a temperature in the range of from 350° C. to 550° C. to cause violent decrepitation whereby the finer particles of decrepitation are carried upward by the stream of gas and the larger particles fall into the fluidized bed to form gangue, collecting the finer particles carried by the stream of gas and drawing off the gangue as an underflow product.

4. The method of simultaneously calcining and classifying colemanite as defined in claim 2 together with the steps of heating said upwardly directed stream of gas.

References Cited by the Examiner

UNITED STATES PATENTS

| 1,487,806 | 3/1924 | Rasor | 23—59 |
| 2,097,411 | 10/1937 | Corkill | 23—59 |
| 2,586,818 | 2/1952 | Harms | 209—138 X |
| 2,621,034 | 12/1952 | Stecker | 209—138 X |
| 3,103,412 | 9/1963 | Dwyer | 23—59 |

FOREIGN PATENTS 629,171  9/1949  Great Britain.

OSCAR R. VERTIZ, *Primary Examiner.*

H. T. CARTER, *Assistant Examiner.*